US011816180B2

(12) United States Patent
Feng et al.

(10) Patent No.: US 11,816,180 B2
(45) Date of Patent: Nov. 14, 2023

(54) METHOD AND APPARATUS FOR CLASSIFYING MIXED SIGNALS, AND ELECTRONIC DEVICE

(71) Applicant: Beijing University of Posts and Telecommunications, Beijing (CN)

(72) Inventors: Zhiyong Feng, Beijing (CN); Kezhong Zhang, Beijing (CN); Zhiqing Wei, Beijing (CN); Li Xu, Beijing (CN); Che Ji, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 44 days.

(21) Appl. No.: 17/602,692

(22) PCT Filed: Mar. 10, 2020

(86) PCT No.: PCT/CN2020/078573
§ 371 (c)(1),
(2) Date: Oct. 12, 2021

(87) PCT Pub. No.: WO2020/215911
PCT Pub. Date: Oct. 29, 2020

(65) Prior Publication Data
US 2022/0180095 A1 Jun. 9, 2022

(30) Foreign Application Priority Data

Apr. 23, 2019 (CN) .......................... 201910328208.9

(51) Int. Cl.
*G06K 9/00* (2022.01)
*G06K 9/62* (2022.01)
*G06F 18/2135* (2023.01)

(52) U.S. Cl.
CPC ...... *G06F 18/2135* (2023.01); *G06F 2218/12* (2023.01)

(58) Field of Classification Search
CPC .................. G06F 18/2135; G06F 2218/12
See application file for complete search history.

(56) References Cited

U.S. PATENT DOCUMENTS

2010/0002816 A1* 1/2010 Mody ................. H04L 27/0012
375/350
2016/0253445 A1 9/2016 Pataky

FOREIGN PATENT DOCUMENTS

CN 1855227 A 11/2006
CN 102445650 A 5/2012
(Continued)

OTHER PUBLICATIONS

Wang et al, "Modulation Classification of Mixed Signals using Fast Independent Component Analysis," 2016, IEEE Wireless Conference and Networking Conference (WCNC 2016) (5 Pages) (Year: 2016).*

(Continued)

*Primary Examiner* — David F Dunphy
(74) *Attorney, Agent, or Firm* — Burr & Forman LLP (57) ABSTRACT

Disclosed is a method for classifying mixed signals, comprising: receiving mixed signals; performing calculation on a matrix corresponding to the mixed signals by means of a preset Principal Component Analysis method to obtain to-be-classified mixed signals and to determine the number of types of signals contained in the to-be-classified mixed signals; determining a separation matrix based on the number of types of signals contained in the to-be-classified mixed signals; separating individual signals in the to-be-classified mixed signals by means of the separation matrix to obtain to-be-identified signals; calculating a preset number of high-order cumulants corresponding to each to-be-iden- (Continued)

tified signal in the to-be-identified signals respectively; taking the calculated high-order cumulants as characteristics of the to-be-identified signal corresponding to the high-order cumulants respectively; inputting the characteristics of the to-be-identified signal into a preset classification model; and obtaining a modulation mode of the to-be-identified signal. The method according to the embodiment of the present application imposes no requirements on the classification environment, which is different from the prior arts in which the mixed signals can be classified only when certain conditions are met. Therefore, the method has universal applicability.

8 Claims, 4 Drawing Sheets

(56) References Cited

FOREIGN PATENT DOCUMENTS

| | | |
|---|---|---|
| CN | 102647259 A | 8/2012 |
| CN | 103973411 A | 8/2014 |
| CN | 104144020 A | 11/2014 |
| CN | 104181513 A | 12/2014 |
| CN | 104757966 A | 7/2015 |
| CN | 105721368 A | 6/2016 |
| CN | 106487730 A | 3/2017 |
| CN | 106842195 A | 6/2017 |
| CN | 107276938 A | 10/2017 |
| CN | 109274625 A | 1/2019 |
| CN | 110059757 A | 7/2019 |

OTHER PUBLICATIONS

Lu Wang, et al, "Modulation Classification of Mixed Signals using Fast Independent Component Analysis", IEEE Wireless Conference and Networking Conference (WCNC 2016) Track 1: PHY and Fundamentals, all pages cited.

Lin Ping, "Real-Time Algorithm of Independent Component", Department of Telecommunication and Engineering, Tongji University Shanghai 200092, China.

The Research of Typical Wireless Communication Signal and Biomedical Signal on, China Academic Journal Electronic Publishing House (C) 1994-2021, http://www.cnki.net.

* cited by examiner

METHOD AND APPARATUS FOR CLASSIFYING MIXED SIGNALS, AND ELECTRONIC DEVICE

The present application claims the priority to a Chinese patent application No. 201910328208.9, filed with the China National Intellectual Property Administration on Apr. 23, 2019 and entitled "METHOD AND APPARATUS FOR CLASSIFYING MIXED SIGNALS, AND ELECTRONIC DEVICE", which is incorporated herein by reference in its entirety.

TECHNICAL FIELD

The application relates to the technical field of mixed signal classification, and in particular to a method and an apparatus for classifying mixed signals, and an electronic device.

BACKGROUND

In the signal transmission process, some interference signals will inevitably be introduced and mixed. After receiving target signals mixed with the interference signals, the signal receiving end needs to classify signals in the mixed signals to obtain a target signal. Since each type of signal corresponds to a specific modulation mode, individual signals in the mixed signals are usually classified by identifying modulation modes of individual signals in the mixed signals.

In the existing methods for classifying mixed signals, individual signals in the mixed signals are usually classified as follows: when powers of individual signals in the mixed signals are the same, or signal strengths of the target signals are much stronger than that of other signals in the mixed signals, firstly individual signals in the mixed signals are separated by calculating a channel matrix of each signal in the mixed signals, and then individual signals in the mixed signals are classified by identifying modulation modes of individual signals.

However, in the process of implementing the present application, the inventor found that the prior arts has at least the following shortcomings: the existing methods for classifying mixed signals impose strict requirements on the classification environment, which is embodied in that the mixed signals can be classified usually only when they meet specific conditions, and the specific conditions include the powers of individual signals in the mixed signals are the same, or the signal strengths of the target signals are much stronger than that of other signals in the mixed signals. It can be seen that the existing methods for classifying mixed signals do not have universal applicability in practical applications, that is, the applicable scenarios thereof are limited.

SUMMARY

The object of the embodiments of the present application is to provide a method and an apparatus for classifying mixed signals and an electronic device, so as to provide a universally applicable method for classifying mixed signals. The specific technical solutions are as follows.

In order to achieve the object, in a first aspect, an embodiment of the present application provides a method for classifying mixed signals, comprising:

receiving mixed signals containing noises and at least two different types of signals;

performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;

determining a separation matrix based on the number of types of signals contained in the to-be-classified mixed signals;

separating individual signals in the to-be-classified mixed signals by means of the separation matrix to obtain to-be-identified signals;

calculating a preset number of high-order cumulants corresponding to each to-be-identified signal in the to-be-identified signals respectively;

taking the calculated high-order cumulants as characteristics of the to-be-identified signal corresponding to the high-order cumulants respectively;

inputting the characteristics of the to-be-identified signal into a preset classification model; wherein the classification model is used for calculating and outputting a modulation mode of the to-be-identified signal based on the characteristics of the to-be-identified signal; and obtaining an output result of the classification model; wherein the output result comprises the modulation mode of the to-be-identified signal.

Optionally, performing calculation on the matrix corresponding to the mixed signals by means of the preset Principal Component Analysis PCA method to obtain to-be-classified mixed signals and to determine the number of types of signals contained in the to-be-classified mixed signals, comprises:

normalizing a matrix R corresponding to the mixed signals to calculate a matrix $\bar{R}$; wherein the matrix $\bar{R}$ is a matrix obtained by normalizing the matrix R corresponding to the mixed signals;

performing centralization processing on the matrix $\bar{R}$, so that an average value of the matrix $\bar{R}$ is 0, in order to calculate a matrix $\hat{R}$;

calculating an autocorrelation matrix of the matrix $\hat{R}$; performing singular value decomposition on the autocorrelation matrix $\mathbf{E}(\hat{R}\cdot\hat{R}")$ of the matrix $\hat{R}$ to obtain $\mathbf{E}(\hat{R}\cdot\hat{R}") = \hat{U}\hat{\Lambda}\hat{U}'''$, wherein $\hat{R}''$ is a transposed conjugate matrix of the matrix $\hat{R}$, $\hat{U}'''$ is a transposed conjugate matrix of $\hat{U}$, $\hat{U}=[\hat{u}_1, \ldots, \hat{u}_N]$ is an orthogonal matrix, and $\hat{u}_n$ is a n-th column of the matrix $\hat{U}$, a diagonal matrix $\hat{\Lambda}$ is $$\hat{\Lambda} = \begin{bmatrix} \lambda_1 & & \\ & \ddots & \\ & & \lambda_N \end{bmatrix},$$

N is the number of antennas receiving the mixed signals; and $\lambda_1, \ldots, \lambda_N$ are singular values of the autocorrelation matrix $\mathbf{E}(\hat{R}\cdot\hat{R}")$;

arranging the singular values $\lambda_1, \ldots, \lambda_N$ from small to large; and setting singular values, whose numerical values are less than a preset threshold, among the singular values $\lambda_1, \ldots, \lambda_N$ to 0, and calculating a diagonal matrix $$\tilde{\Lambda} = \begin{bmatrix} \lambda_1 & & \\ & \ddots & \\ & & \lambda_n \end{bmatrix};$$

letting $\tilde{U}[\hat{u}_1, \ldots, \hat{u}_N]$, calculating the to-be-classified mixed signals using a preset formula $\tilde{R} \triangleq \tilde{U} \cdot [\hat{r}_l, \ldots, \hat{r}_L]$; the matrix corresponding to the to-be-classified mixed signals is $\tilde{R}$; and determining the number of types of signals contained in the to-be-classified mixed signals based on the number of singular values that are not 0 among the singular values $\lambda_1, \ldots, \lambda_N$.

Optionally, determining the separation matrix based on the number of types of signals contained in the to-be-classified mixed signals, comprises:

obtaining a preset number of iterations and an initial separation matrix w; and by means of a preset formula $$w_{m,(k)}^+ = \frac{1}{L} \sum_{i=1}^{L} \xi(w_{m,(k-1)}\tilde{r}_i)\tilde{r}_i^T - w_{m,(k-1)} \frac{1}{L} \sum_{i=1}^{L} \xi'(w_{m,(k-1)}\tilde{r}_i),$$

calculating the separation matrix w based on the number of iterations and the initial separation matrix w; wherein the separation matrix w has M rows and N columns, M represents the number of types of signals contained in the to-be-classified mixed signals, N represents the number of antennas receiving the mixed signals, L represents the number of times of receiving signals, $w_{m,(k)}^+$ represents a result of a m-th column of the separation matrix w after k iterations, $\xi(w_{m,(k-1)}\tilde{r})=\tanh(w_{m,(k-1)}\tilde{r})$, $\xi'(w_{m,(k-1)}\tilde{r})=\mathrm{sech}^2(w_{m,(k-1)}\tilde{r})$, a vector $\tilde{r}_i$ is an i-th column of the to-be-classified mixed signals $\tilde{R}$.

Optionally, separating individual signals in the to-be-classified mixed signals by means of the separation matrix to obtain to-be-identified signals, comprises:

normalizing the separation matrix w to obtain a matrix $\tilde{w}$;

multiplying the separation matrix $\tilde{w}$ with the matrix $\tilde{R}$ corresponding to the to-be-classified mixed signals to separate individual signals in the to-be-classified mixed signals to obtain the to-be-identified signals.

Optionally, taking the calculated high-order cumulants as characteristics of the to-be-identified signal corresponding to the high-order cumulants respectively, comprises:

normalizing the high-order cumulants; and taking the normalized high-order cumulants as the characteristics of the to-be-identified signal corresponding to the high-order cumulants.

Optionally, the classification model is a support vector machine model;

before inputting the characteristics of the to-be-identified signal into the preset classification model, the method further comprises:

inputting training samples with labels into a current support vector machine model to obtain a modulation mode corresponding to each of the training samples output by the current support vector machine model;

calculating a loss value using a preset loss function based on an output result of the current support vector machine model and the labels of the training samples; and adjusting parameters in a current support vector machine according to the loss value to obtain the support vector machine model.

In a second aspect, an embodiment of the present application provides an apparatus for classifying mixed signals, comprising:

a receiving module configured for receiving mixed signals containing noises and at least two different types of signals;

an analysis module configured for performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;

a determining module configured for determining a separation matrix based on the number of types of signals contained in the to-be-classified mixed signals;

a separating module configured for separating individual signals in the to-be-classified mixed signals by means of the separation matrix to obtain to-be-identified signals;

a calculating module configured for calculating a preset number of high-order cumulants corresponding to each to-be-identified signal in the to-be-identified signals respectively;

a characteristics module configured for taking the calculated high-order cumulants as characteristics of the to-be-identified signal corresponding to the high-order cumulants respectively;

an inputting module configured for inputting the characteristics of the to-be-identified signal into a preset classification model; wherein the classification model is used for calculating and outputting a modulation mode of the to-be-identified signal based on the characteristics of the to-be-identified signal; and an obtaining module configured for obtaining an output result of the classification model; wherein the output result comprises the modulation mode of the to-be-identified signal.

In a third aspect, an embodiment of the present application provides an electronic device, including a processor, a communication interface, a memory, and a communication bus, wherein the processor, the communication interface and the memory communicate with each other through the communication bus;

the memory is configured for storing computer programs;

the processor is configured for implementing the following steps when executing the computer programs stored in the memory:

receiving mixed signals containing noises and at least two different types of signals;

performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;

determining a separation matrix based on the number of types of signals contained in the to-be-classified mixed signals;

separating individual signals in the to-be-classified mixed signals by means of the separation matrix to obtain to-be-identified signals;

calculating a preset number of high-order cumulants corresponding to each to-be-identified signal in the to-be-identified signals respectively;

taking the calculated high-order cumulants as characteristics of the to-be-identified signal corresponding to the high-order cumulants respectively;

inputting the characteristics of the to-be-identified signal into a preset classification model; wherein the classification model is used for calculating and outputting a modulation mode of the to-be-identified signal based on the characteristics of the to-be-identified signal; and obtaining an output result of the classification model; wherein the output result comprises the modulation mode of the to-be-identified signal.

In a fourth aspect, an embodiment of the present application provides a computer-readable storage medium, having stored thereon computer programs that, upon executed by a processor, cause the implementation of the following steps:

receiving mixed signals containing noises and at least two different types of signals;

performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;

determining a separation matrix based on the number of types of signals contained in the to-be-classified mixed signals;

separating individual signals in the to-be-classified mixed signals by means of the separation matrix to obtain to-be-identified signals;

calculating a preset number of high-order cumulants corresponding to each to-be-identified signal in the to-be-identified signals respectively;

taking the calculated high-order cumulants as characteristics of the to-be-identified signal corresponding to the high-order cumulants respectively;

inputting the characteristics of the to-be-identified signal into a preset classification model; wherein the classification model is used for calculating and outputting a modulation mode of the to-be-identified signal based on the characteristics of the to-be-identified signal; and obtaining an output result of the classification model; wherein the output result comprises the modulation mode of the to-be-identified signal.

The embodiments of the present application provide a method and apparatus for classifying mixed signals and electronic device, which can implement the followings: after receiving mixed signals, performing calculation on a matrix corresponding to the mixed signals by means of a preset Principal Component Analysis PCA method to obtain to-be-classified mixed signals and to determine the number of types of signals contained in the to-be-classified mixed signals; determining a separation matrix based on the number of types of signals contained in the to-be-classified mixed signals; separating individual signals in the to-be-classified mixed signals by means of the separation matrix to obtain to-be-identified signals; calculating a preset number of high-order cumulants corresponding to each to-be-identified signal in the to-be-identified signals respectively; taking the calculated high-order cumulants as characteristics of the to-be-identified signal corresponding to the high-order cumulants respectively; inputting the characteristics of the to-be-identified signal into a preset classification model; and obtaining an output result of the classification model. The method for classifying mixed signals according to the embodiment of the present application imposes no requirements on the classification environment, which is different from the prior arts in which the mixed signals can be classified only when certain conditions are met. Therefore, the method for classifying mixed signals according to the embodiment of the present application has universal applicability compared with the prior arts.

Obviously, any product or method implementing the present application does not necessarily need to achieve all the advantages described above simultaneously.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application, and those skilled in the art can also obtain other drawings based on these drawings without any creative efforts.

DETAILED DESCRIPTION

The present application is further described in detail below with reference to the appended drawings and embodiments, for the purpose of clarifying the objects, technical solutions and advantages of the present application. Obviously, the described embodiments are only some, and not all, of the embodiments of the present application. All other embodiments obtained based on the embodiments of the present application by those skilled in the art without any creative efforts fall into the scope of protection defined by the present application.

In order to solve the problem that the prior arts impose high requirements on the classification environment and need to meet specific conditions to classify mixed signals, embodiments of the present application provide a method and an apparatus for classifying mixed signals and an electronic device.

A method for classifying mixed signals according to an embodiment of the present application is first introduced below. The method for classifying mixed signals according to the embodiment of the present application may be applied to a signal receiving end, but of course it is not limited to this application. In addition, the mixed signals involved in this application are signal data containing multiple different signals obtained by mixing one type of signal with some interference signals. It can be understood that the interference signals are different from noises in the signal transmission process, and the one type of signal in transmission may be changed into multiple types through the interference signals.

Figure 1A:
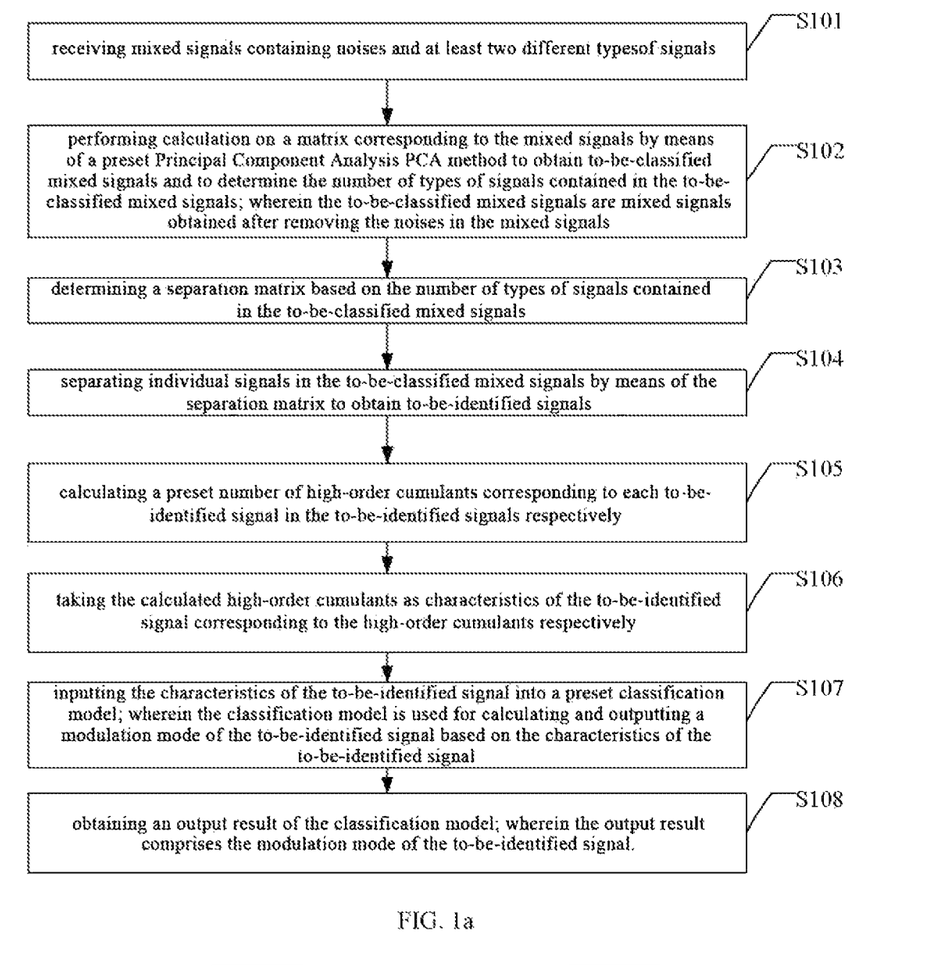
FIG. 1a is a schematic flowchart of a method for classifying mixed signals according to an embodiment of the present application.

An embodiment of the present application provides a method for classifying mixed signals. Referring to FIG. 1a, the method includes the followings.

At S101, mixed signals containing noises and at least two different types of signals are received.

Figure 1B:
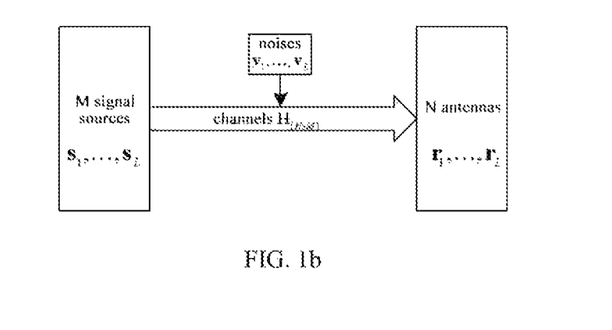
FIG. 1b is a schematic diagram of a model for sending and receiving signals.

Specifically, since one signal source corresponds to one type of signal. For example, there are 3 signal sources, which means that 3 types of signals are sent at the same time. Referring to FIG. 1b, M signal sources may be used to simultaneously send signals L times, and N antennas may be used to receive these signals sent L times. In order to ensure that the mixed signals can be completely received, M≤N may be set, wherein, L may be a positive integer not less than 1.

Then, the l-th received signal may be expressed as $r_l = [r_{l,1}, \ldots, r_{l,N}]^T (l=1, \ldots, L)$, then $r_l$ may be expressed as $r_l = Hs_l + v_l$, wherein $s_r = s_l = [s_{l,1}, \ldots, s_{l,M}]^T$ is the l-th sent signal, $H \in \mathbb{C}^{N \times M}$ is a channel matrix, (n-th, m-th) symbol $h_{nm}$, of the matrix H is defined as a channel gain between the m-th sent signal and the n-th received signal of a complex channel, noises are $v_l = [v_{l,1}, \ldots, v_{l,N}]^T$ $\mathcal{CN}(0, \sigma^2 I)$, $\mathcal{CN}$ is a complex normal distribution, and I is an identity matrix.

It should be noted that received mixed signals are signals obtained by mixing one type of signal in transmission with other types of signals, that is, signals obtained by mixing one type of signal from one signal source in transmission with other types of signals from other signal sources.

The so-called complex channel is a channel that transmits complex signals. A complex signal is a signal characterization method. Specifically, the modulus of a complex number is used to represent the magnitude of a signal, and the argument of the complex number is used to represent the phase of the signal.

At S102, calculation is performed on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals.

Principal Component Analysis (PCA) is a statistical method. A group of potentially correlated variables are transformed into a group of linearly uncorrelated variables through orthogonal transformation, and the transformed group of variables is called principal component. Those skilled in the art can understand that PCA may be used to filter out noises. Since the influence of any component change is far greater than the influence of random noises, various components are relatively unaffected by the noises, that is, the principal components may be used to reconstruct original data. The specific implementation of performing calculation on a matrix corresponding to the mixed signals by means of a preset Principal Component Analysis PCA method to obtain to-be-classified mixed signals and to determine the number of types of signals contained in the to-be-classified mixed signals may be the same as that in the prior arts, which is not described in detail in this application.

At S103, a separation matrix is determined based on the number of types of signals contained in the to-be-classified mixed signals.

Exemplarily, in one implementation, determining the separation matrix based on the number of types of signals contained in the to-be-classified mixed signals, includes:

obtaining a preset number of iterations and an initial separation matrix w; and by means of a preset formula $$w_{m,(k)}^+ = \frac{1}{L}\sum_{i=1}^{L}\xi(w_{m,(k-1)}\tilde{r}_i)\tilde{r}_i^T - w_{m,(k-1)}\frac{1}{L}\sum_{i=1}^{L}\xi'(w_{m,(k-1)}\tilde{r}_i),$$

calculating the separation matrix w based on the number of iterations and the initial separation matrix w; wherein the separation matrix w has M rows and N columns, M represents the number of types of signals contained in the to-be-classified mixed signals, N represents the number of antennas receiving the mixed signals, L represents the number of times of receiving signals, $w_{m,(k)}^+$ represents a result of a m-th column of the separation matrix w after k iterations, $\xi(w_{m,(k-1)}\tilde{r})=\tanh(w_{m,(k-1)}\tilde{r})$, $\xi(w_{m,(k-1)}\tilde{r})=\text{sech}^2(w_{m,(k-1)}\tilde{r})$, a vector $\tilde{r}_i$ is an i-th column of the to-be-classified mixed signals $\tilde{R}$. It can be understood that L may be also called the number of times of sampling signals, and the value of L is the same as the number of times of sending signals.

At S104, individual signals in the to-be-classified mixed signals are separated by means of the separation matrix to obtain to-be-identified signals.

It should be emphasized that separating different types of signals in the to-be-classified mixed signals by means of the separation matrix to obtain to-be-identified signals means separating individual signals in the to-be-classified mixed signals by means of the separation matrix to obtain various to-be-identified signals.

Exemplarily, separating individual signals in the to-be-classified mixed signals by means of the separation matrix to obtain to-be-identified signals, includes:

normalizing the separation matrix w to obtain a matrix w̃;

multiplying the separation matrix w̃ with the matrix $\tilde{R}$ corresponding to the to-be-classified mixed signals to separate individual signals in the to-be-classified mixed signals to obtain the to-be-identified signals.

At S105, a preset number of high-order cumulants corresponding to each to-be-identified signal in the to-be-identified signals are respectively calculated.

In practical applications, in order to improve the accuracy of the classification results, for each of the to-be-identified signals, a plurality of high-order cumulants corresponding to this to-be-identified signal may be calculated respectively, and the calculated high-order cumulants are regarded as the characteristics of this to-be-identified signal. It can be understood that each type of to-be-identified signal has a preset number of high-order cumulants, wherein the process of calculating the preset number of high-order cumulants corresponding to each type of to-be-identified signal may refer to any implementation of calculating the high-order cumulants of a signal in the prior arts, which will not be repeated here.

At S106, the calculated high-order cumulants are taken as characteristics of the to-be-identified signal corresponding to the high-order cumulants respectively.

It can be understood that each type of to-be-identified signal corresponds to high-order cumulants. Then, for each type of to-be-identified signal, the high-order cumulants corresponding to a to-be-identified signal may be taken as the characteristics corresponding to this to-be-identified signal.

Exemplarily, in one implementation, taking the calculated high-order cumulants as the characteristics of the to-be-identified signal corresponding to the high-order cumulants respectively, includes:

normalizing the high-order cumulants; and taking the normalized high-order cumulants as the characteristics of the to-be-identified signal corresponding to the high-order cumulants.

Specifically, for each type of to-be-identified signal, the high-order cumulants corresponding to this type of to-be-identified signal are normalized, and the normalized high-order cumulants are taken as the characteristics of this type of to-be-identified signal.

Exemplarily, in another implementation, for each type of to-be-identified signal, the high-order cumulants corresponding to this type of to-be-identified signal are determined as the characteristics of this type of to-be-identified signal.

At S107, the characteristics of the to-be-identified signal are inputted into a preset classification model; wherein the classification model is used for calculating and outputting a modulation mode of the to-be-identified signal based on the characteristics of the to-be-identified signal.

The classification model may be of multiple types, such as a neural network model, or a support vector machine model, etc.

At S108, an output result of the classification model is obtained; wherein the output result includes the modulation mode of the to-be-identified signal.

After the modulation modes of various to-be-identified signals are obtained, the classification of individual signals in the mixed signals may be completed.

It can be seen from the embodiment shown in FIG. 1a, the method for classifying mixed signals according to the embodiment of the present application imposes no requirements on the classification environment, which is different from the prior arts in which the mixed signals can be classified only when certain conditions are met. Therefore, the method for classifying mixed signals according to the embodiment of the present application has universal applicability compared with the prior arts.

In a specific embodiment, the classification model may be a support vector machine model.

Before the characteristics of the to-be-identified signal are input into the preset classification model, the method further includes:

inputting training samples with labels into a current support vector machine model to obtain a modulation mode corresponding to each of the training samples output by the current support vector machine model;

calculating a loss value using a preset loss function based on an output result of the current support vector machine model and the labels of the training samples; and adjusting parameters in the current support vector machine according to the loss value to obtain the support vector machine model;

wherein the training samples are signal data, and the labels of the training samples are the modulation modes of the signal data.

For example, the support vector machine model may be $\breve{w}_i^* \tilde{z}_i' + b_i^*$, wherein parameter $\breve{w}_i^*$ represents a weight, and parameter $b_i^*$ represents a bias, $\tilde{z}'$ represents a characteristic of a signal.

There are S training samples $\tilde{y}_1', \tilde{y}_2', \ldots, \tilde{y}_s'$. The feature vectors corresponding to the training samples are $\tilde{z}_1', \tilde{z}_2', \ldots, \tilde{z}_s'$ respectively, and the labels corresponding to the training samples are $\xi_1, \xi_2, \ldots, \xi_s$ respectively. The feature vectors $\tilde{z}_1', \tilde{z}_2', \ldots, \tilde{z}_s'$ and its corresponding labels $\xi_1, \xi_2, \ldots, \xi_s$ are inputted into the current support vector machine model to obtain the modulation mode corresponding to each of the training samples output by the current support vector machine model; based on the output result of the current support vector machine model and the labels of the training samples, the following preset loss function is used to calculate the loss value:

$$\underset{\bar{w}_i^*, e_s^i, b_i^*}{\text{minimize}} \; \frac{1}{2}\sum_{j=1}^{l}\|\bar{w}_j^*\|_2^2 + \tilde{\gamma}\sum_{s=1}^{S}\sum_{\substack{1 \le j \le S \\ j \ne t_s}} e_s^j$$

$$\text{subject to } (\bar{w}_{t_s}^{*T} z_s' + b_{t_s}^*) - (\bar{w}_i^{*T} z_i' + b_i^*) \ge 2 - e_s^i, \cdot$$
$$e_s^i \ge 0,$$
$$S = 1, \ldots, S,$$
$$i \in \{1, \ldots, I\} \backslash \{t_s\}$$

The parameters $\breve{w}_i^*$ and $b_i^*$ in the current support vector machine are adjusted according to the loss value to obtain the support vector machine model. $t_s \in \{1, \ldots, I\}$ indicates that training sample $\tilde{y}_s'$ belongs to the $t_s$-th modulation mode, that is, the training sample $\tilde{y}_s'$ belongs to the $t_s$-th type of signal; I represents how many modulation modes the support vector machine model can identify. For example, if I is 3, it indicates that the support vector machine model can identify 3 modulation modes. $i \in \{1, \ldots, I\} \backslash \{t_s\}$ represents a slack variable; $\gamma > 0$ is a coefficient of a penalty term, which is a constant and used to control a degree of penalty for a wrong sample; $e_s^i$ represents an error value between the output result and an actual result.

In a specific embodiment, the slack variable and the coefficient of the penalty term may be set to 0.1 and 0.2, respectively.

In a specific embodiment, a formula $m_{test} = \arg\max_{i \in \{1,2,\ldots,I\}}(\breve{w}_i^{*T}\tilde{z}_{test}' + b_i^*)$ may be used to calculate the characteristic corresponding to the modulation mode according to the modulation mode. $m_{test}$ represents the modulation mode; $\tilde{z}_{test}'$ represents the characteristics corresponding to $m_{test}$; the function of argmax( ) is used to calculate the value of parameter t corresponding to the maximum result value, that is, to obtain a characteristic corresponding to a modulation mode with the maximum possibility.

In practical applications, the general process of the method according to the embodiment of this application may be as follows.

At a first step, noises in the mixed signals are removed by means of the preset Principal Component Analysis PCA method to avoid the influence of noises on the classification results, to obtain the matrix $\tilde{R}$ corresponding to the to-be-classified mixed signals.

At a second step, the separation matrix w is determined based on the number of types of signals contained in the to-be-classified mixed signals; the separation matrix w is multiplied with the matrix $\tilde{R}$ corresponding to the to-be-classified mixed signals obtained in the first step to reduce the correlation between individual signals in the to-be-classified mixed signals to obtain the to-be-identified signals. In practical applications, in order to reduce the amount of calculation, usually before the multiplication of the separation matrix w and the to-be-classified mixed signals $\tilde{R}$, the separation matrix w is normalized to obtain the matrix $\breve{w}$, and then the matrix $\breve{w}$ is multiplied with the matrix $\tilde{R}$ corresponding to the to-be-classified mixed signals.

At a third step, for each to-be-identified signal, the plurality of high-order cumulants corresponding to the tobe-identified signal are calculated, and the calculated high-order cumulants are regarded as the characteristics of the to-be-identified signal, which are inputted into a preset classification model of a support vector machine model, the modulation format of the to-be-identified signal is identified through the support vector machine model, so as to achieve the purpose of classifying the mixed signals.

Figure 2:
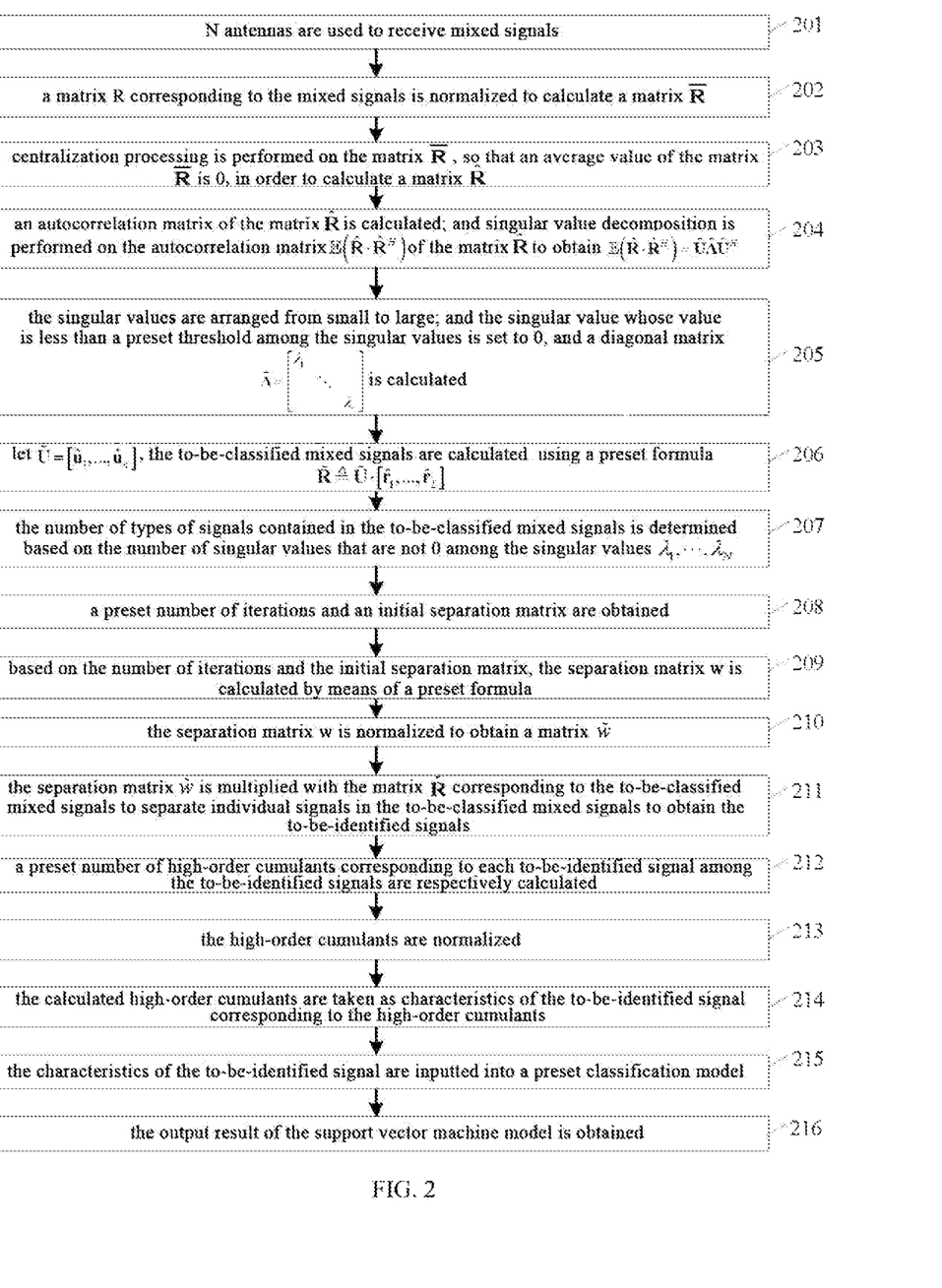
FIG. 2 is another schematic flowchart of an embodiment of the present application.

Referring to FIG. 2, an actual example is listed below to further illustrate a method according to an embodiment of the present application.

At S201, N antennas are used to receive mixed signals; wherein N is a positive integer greater than 1.

In practical applications, in order to ensure that the signals can be completely received, the number of antennas is usually greater than or equal to the number of signals that may be contained in the mixed signals.

At S202, a matrix R corresponding to the mixed signals is normalized to calculate a matrix $\overline{R}$.

At S203, centralization processing is performed on the matrix $\overline{R}$, so that an average value of the matrix $\overline{R}$ is 0, in order to calculate a matrix $\hat{R}$.

At S204, an autocorrelation matrix of the matrix $\hat{R}$ is calculated; singular value decomposition is performed on the autocorrelation matrix $\mathbb{E}(\hat{R}\cdot\hat{R}")$ of the matrix $\hat{R}$ to obtain $\mathbb{E}(\hat{R}\cdot\hat{R}")=\hat{U}\hat{\Lambda}\hat{U}"$, wherein $\hat{R}$ is a transposed conjugate matrix of the matrix $\hat{R}$, $\hat{U}"$ is a transposed conjugate matrix of $\hat{U}$, $\hat{U}=[\hat{u}_1, \ldots, \hat{u}_N]$ is an orthogonal matrix, and $\hat{u}_n$ is a n-th column of the matrix $\hat{U}$, a diagonal matrix $\hat{\Lambda}$ is $$\hat{\Lambda} = \begin{bmatrix} \lambda_1 & & \\ & \ddots & \\ & & \lambda_N \end{bmatrix},$$

N is the number of antennas receiving the mixed signals; and $\lambda_1, \ldots, \lambda_N$ are singular values of the autocorrelation matrix $\mathbb{E}(\hat{R}\cdot\hat{R}")$.

At S205, the singular values $\lambda_1, \ldots, \lambda_N$ are arranged from small to large; and singular values, whose numerical values are less than a preset threshold, among the singular values $\lambda_1, \ldots, \lambda_N$ are set to 0, and a diagonal matrix $$\tilde{\Lambda} = \begin{bmatrix} \lambda_1 & & \\ & \ddots & \\ & & \lambda_n \end{bmatrix}$$

is calculated.

At S206, Let $\tilde{U}=[\hat{u}_1, \ldots, \hat{u}_N]$, the to-be-classified mixed signals are calculated using a preset formula $\tilde{R} \triangleq \tilde{U} \cdot [\tilde{r}_1, \ldots, \tilde{r}_L]$; the matrix corresponding to the to-be-classified mixed signals is $\tilde{R}$.

At S207, the number of types of signals contained in the to-be-classified mixed signals is determined based on the number of singular values that are not 0 among the singular values $\lambda_1, \ldots, \lambda_N$.

For example, the number of singular values that are not 0 among the singular values $\lambda_1, \ldots, \lambda_N$ is 3, so it is determined that the to-be-classified mixed signals contain 3 different types of signals.

At S208, a preset number of iterations and an initial separation matrix are obtained.

Specifically, the number of iterations and the initial separation matrix may be set manually. For example, the number of iterations is set to 10, and the initial separation matrix is set to an identity matrix with M rows and N columns, wherein M is the number of types of the signals contained in the received mixed signals, and N is the number of antennas. For example, if the number of types of the signals contained in the received mixed signals is 3 and the number of antennas is 10, the initial separation matrix is an identity matrix with 3 rows and 10 columns.

At S209, based on the number of iterations and the initial separation matrix, the separation matrix w is calculated using a preset formula $$w_{m,(k)}^+ = \frac{1}{L}\sum_{i=1}^{L}\xi(w_{m,(k-1)}\tilde{r}_i)\tilde{r}_i^T - w_{m,(k-1)}\frac{1}{L}\sum_{i=1}^{L}\xi'(w_{m,(k-1)}\tilde{r}_i);$$

wherein the separation matrix w has M rows and N columns, M represents the number of types of signals contained in the to-be-classified mixed signals, N represents the number of antennas receiving the mixed signals, L represents the number of times of receiving signals, $w_{m,(k)}^+$ represents a result of a m-th column of the separation matrix w after k iterations, $\xi(w_{m,(k-1)}\tilde{r})=\tanh(w_{m,(k-1)}\tilde{r})$, $\xi'(w_{m,(k-1)}\tilde{r})=\text{sech}^2(w_{m,(k-1)}\tilde{r})$, a vector $\tilde{r}_i$ is an i-th column of the to-be-classified mixed signals $\tilde{R}$, the function of tanh( ) is the hyperbolic tangent function, and the function of sech( ) is the hyperbolic secant function.

At S210, the separation matrix w is normalized to obtain a matrix $\tilde{w}$.

At S211, the matrix $\tilde{w}$ is multiplied with the matrix $\tilde{R}$ corresponding to the to-be-classified mixed signals to separate individual signals in the to-be-classified mixed signals to obtain to-be-identified signals.

Specifically, the matrix $\tilde{w}$ is multiplied with the matrix $\tilde{R}$ corresponding to the to-be-classified mixed signals to make each column in the matrix $\tilde{R}$ uncorrelated with others.

Specifically, the matrix $\tilde{w}$ is multiplied with the matrix $\tilde{R}$ corresponding to the to-be-classified mixed signals to obtain a matrix $\overline{R}$, wherein each column of the matrix $\overline{R}$ corresponds to one type of to-be-identified signal. For example, if the matrix $\overline{R}$ has 3 columns, it means that there are 3 types of to-be-identified signals.

At S212, a preset number of high-order cumulants corresponding to each to-be-identified signal among the to-be-identified signals are respectively calculated.

In a specific embodiment, five high-order cumulants corresponding to each to-be-identified signal may be calculated as $C_{20}$, $C_{21}$, $C_{40}$, $C_{41}$, and $C_{42}$.

The method for calculating the high-order cumulants can be found in the prior arts, and only calculation formulas of the high-order cumulants different from those in the prior arts are given below:

For random variables $x=[x_1, \ldots, x_n]^T$, $n=1,2,\ldots,N$, the different calculation formulas of the high-order cumulants may be:

$$\hat{C}_{20}(x) = \frac{1}{N}\sum_{n=1}^{N}x^2[n]$$

$$\hat{C}_{21}(x) = \frac{1}{N}\sum_{n=1}^{N}|x^2[n]|^2$$

$$\hat{C}_{40}(x) = \frac{1}{N}\sum_{n=1}^{N}x^4[n] - 3\tilde{C}_{2n}(x)$$

-continued $$\hat{C}_{41}(x) = \frac{1}{N}\sum_{n=1}^{N} x^3[n]x^4[n] - 3\tilde{C}_{20}(x)\hat{C}_{21}(x).$$

According to the above formulas, the plurality of high-order cumulants selected by the to-be-identified signals may be calculated separately.

At S213, the high-order cumulants are normalized.

In order to simplify the calculation, the calculated high-order cumulants are usually normalized in practical applications. For example, in a specific embodiment, the following formula may be used to normalize the high-order cumulants:

$$\overline{C_{vu}(x)} = \frac{C_{vu}(x)}{|C_{21}(x)|^{\frac{v}{2}}}.$$

At S214, the calculated high-order cumulants are taken as characteristics of the to-be-identified signal corresponding to the high-order cumulants.

At S215, the characteristics of the to-be-identified signal are inputted into a preset support vector machine model;

At S216, an output result of the support vector machine model is obtained.

The method for classifying mixed signals according to the embodiment of the present application imposes no requirements on the classification environment, which is different from the prior arts in which the mixed signals can be classified only when certain conditions are met. Therefore, the method for classifying mixed signals according to the embodiment of the present application has universal applicability compared with the prior arts.

In addition, the method according to the embodiment of the present application further uses the preset Principal Component Analysis PCA method to remove the influence of noises on the signals, thereby improving the accuracy of signal modulation mode identification. An example is described below.

Figure 3:
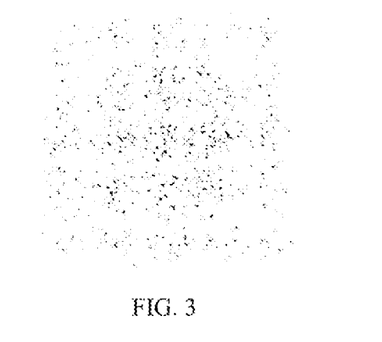
FIG. 3 is a constellation diagram of mixed signals received by a receiving end, which are mixed from signals QPSK and 16 QAM.
Figure 4:
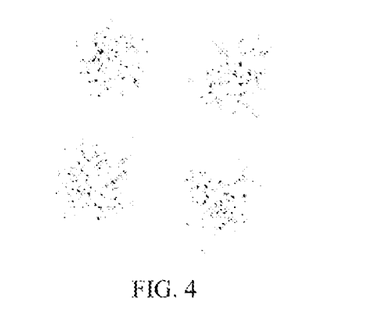
FIG. 4 is a constellation diagram corresponding to the QPSK signals in the mixed signals obtained by processing the mixed signals without using a PCA according to an embodiment of the present application.
Figure 5:
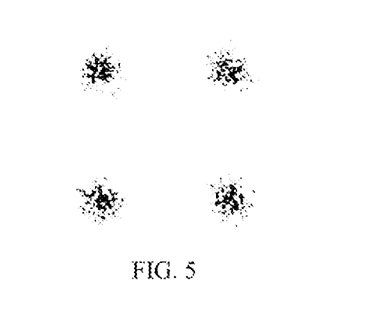
FIG. 5 is a constellation diagram corresponding to the QPSK signal in the mixed signals obtained by processing the mixed signals using the PCA according to an embodiment of the present application.

As is shown in FIG. 3, it is a constellation diagram of mixed signals received by a receiving end, which are mixed from signals QPSK and 16 QAM. Referring to FIG. 3, due to the presence of noises, constellation points in the constellation diagram of the mixed signals are relatively scattered. If the PCA according to the embodiment of the application is not used to process the mixed signals, a constellation diagram corresponding to the signal QPSK in the mixed signals is obtained as shown in FIG. 4. On the other hand, if the PCA according to the embodiment of this application is used to process the mixed signals, a constellation diagram corresponding to the signal QPSK in the mixed signals is obtained as shown in FIG. 5. Good signals are shown as concentrated constellation points on the constellation diagram, and signals containing noises are shown as scattered constellation points on the constellation diagram. By comparing FIGS. 4 and 5, it can be seen that the constellation points in the constellation diagram shown in FIG. 5 are more concentrated. It can be seen that after the mixed signals is processed using the PCA according to the embodiment of the present application, a better signal QPSK can be obtained.

In summary, after the PCA processing, the clarity of the constellation image is improved, and thus the accuracy of signal modulation mode identification is improved.

Figure 6:
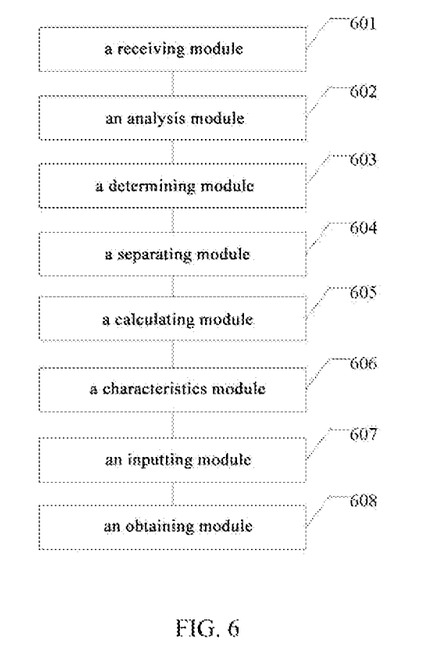
FIG. 6 is a schematic structural diagram of an apparatus for classifying mixed signals according to an embodiment of the present application.

Corresponding to the embodiment shown in FIG. 1a, an embodiment of the present application further provides an apparatus for classifying mixed signals as shown in FIG. 6, including:

a receiving module 601 configured for receiving mixed signals containing noises and at least two different types of signals;

an analysis module 602 configured for performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;

a determining module 603 configured for determining a separation matrix based on the number of types of signals contained in the to-be-classified mixed signals;

a separating module 604 configured for separating various signals in the to-be-classified mixed signals by means of the separation matrix to obtain to-be-identified signals;

a calculating module 605 configured for calculating a preset number of high-order cumulants corresponding to each to-be-identified signal in the to-be-identified signals respectively;

a characteristics module 606 configured for taking the calculated high-order cumulants as characteristics of the to-be-identified signal corresponding to the high-order cumulants respectively;

an inputting module 607 configured for inputting the characteristics of the to-be-identified signal into a preset classification model; wherein the classification model is used for calculating and outputting a modulation mode of the to-be-identified signal based on the characteristics of the to-be-identified signal; and an obtaining module 608 configured for obtaining an output result of the classification model; wherein the output result includes the modulation mode of the to-be-identified signal.

The apparatus for classifying mixed signals according to the embodiment of the present application imposes no requirements on the classification environment, which is different from the prior arts in which the mixed signals can be classified only when certain conditions are met. Therefore, the apparatus for classifying mixed signals according to the embodiment of the present application has universal applicability compared with the prior arts.

Figure 7:
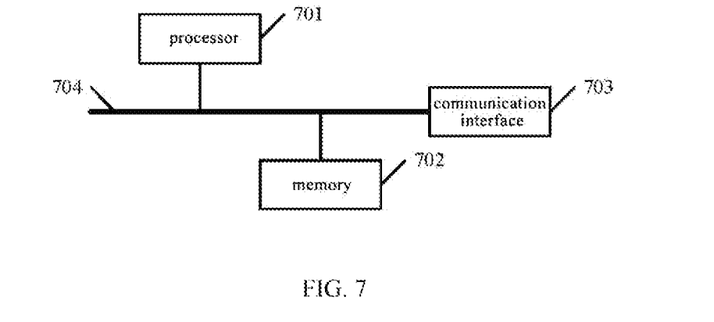
FIG. 7 is a schematic structural diagram of an electronic device according to an embodiment of the present application.

Corresponding to the embodiment shown in FIG. 1a, an embodiment of the present application further provides an electronic device, as shown in FIG. 7, including a processor 701, a communication interface 702, a memory 703, and a communication bus 704, wherein the processor 701, the communication interface 702 and the memory 703 communicate with each other through the communication bus 704;

the memory 703 is configured for storing computer programs; and the processor 701 is configured for implementing steps of the methods for classifying mixed signals according to the embodiments of the present application when executing the programs stored in the memory 703.

The steps of the methods for classifying mixed signals performed by the electronic device according to the embodiment of the present application imposes no requirements on the classification environment, which is different from the prior arts in which the mixed signals can be classified only when certain conditions are met. Therefore, the electronic device according to the embodiment of the present application has universal applicability compared with the prior arts.

The communication bus in the above electronic device may be a Peripheral Component Interconnect (PCI) bus or an Extended Industry Standard Architecture (EISA) bus. The communication bus may be divided into an address bus, a data bus, a control bus, and the like. For convenience, the communication bus is only shown as one thick line in the figure, but it does not mean that there is only one bus or one type of bus.

The communication interface is used for communication between the above electronic device and other devices.

The memory may include a Random Access Memory (RAM), and may also include a Non-Volatile Memory (NVM), such as at least one disk storage. Optionally, the memory may also be at least one storage device located away from the aforementioned processor.

The above processor may be a general-purpose processor, including a Central Processing Unit (CPU), a Network Processor (NP), etc.; or may be a Digital Signal Processing (DSP), an Application Specific Integrated Circuit (ASIC), a Field-Programmable Gate Array (FPGA) or other programmable logic device, discrete gate or transistor logic device, discrete hardware component.

Another embodiment of the application further provides a computer-readable storage medium, having stored thereon computer programs that, upon execution by a processor, cause the implementation of the steps of the methods for classifying mixed signals.

Another embodiment of the present application further provides a computer program product containing instructions that, upon executed on a computer, causes the computer to implement any of the methods for classifying mixed signals.

The above embodiments can be all or partly implemented by software, hardware, firmware, or any combination thereof. When implemented by software, it may be all or partly implemented in the form of a computer program product. The computer program product includes one or more computer instructions. When the computer program instructions are loaded and executed on a computer, the procedures or functions described in accordance with the embodiments of the present application will be realized in whole or in part. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any usable medium that can be accessed by a computer or a data storage device, such as an integrated server, an integrated data center, etc., that includes one or more usable media. The usable media may be a magnetic media (e.g., a floppy Disk, a hard Disk, a magnetic tape), an optical media (e.g., DVD), or a semi-conductor media (e.g., a Solid State Disk (SSD)), and the like.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements defined by the sentences "comprise(s) a . . . " or "include(s) a ..." do not exclude that there are other identical elements in the processes, methods, articles, or devices which comprise these elements.

Each embodiment in this specification is described in a related manner, and the same or similar parts between the various embodiments can be referred to each other, and each embodiment focuses on the difference from other embodiments. In particular, as for the apparatus embodiment, since it is basically similar to the method embodiment, the description is relatively simple, and for related parts, please refer to the part of the description of the method embodiment.

The above description is only the preferred embodiments of the present application and is not intended to limit the present application. Any amendments, equivalent substitutions, improvements etc. made within the spirit and principle of the present application are all included in the protection scope of the present application.

What is claimed is:

1. A method for classifying mixed signals, comprising:
   receiving mixed signals containing noises and at least two different types of signals;
   performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;
   determining a separation matrix based on the number of types of signals contained in the to-be-classified mixed signals;
   separating individual signals in the to-be-classified mixed signals by means of the separation matrix to obtain to-be-identified signals;
   calculating a preset number of high-order cumulants corresponding to each to-be-identified signal in the to-be-identified signals respectively;
   taking the calculated high-order cumulants as characteristics of the to-be-identified signal corresponding to the high-order cumulants respectively;
   inputting the characteristics of the to-be-identified signal into a preset classification model; wherein the classification model is used for calculating and outputting a modulation mode of the to-be-identified signal based on the characteristics of the to-be-identified signal; and
   obtaining an output result of the classification model; wherein the output result comprises the modulation mode of the to-be-identified signal;
   wherein performing calculation on the matrix corresponding to the mixed signals by means of the preset Principal Component Analysis PCA method to obtain to-be-classified mixed signals and to determine the number of types of signals contained in the to-be-classified mixed signals, comprises:
   normalizing a matrix R corresponding to the mixed signals to calculate a matrix $\bar{R}$; wherein the matrix $\bar{R}$ is a matrix obtained by normalizing the matrix R corresponding to the mixed signals;

performing centralization processing on the matrix $\overline{R}$, so that an average value of the matrix $\overline{R}$ is 0, in order to calculate a matrix $\hat{R}$;

calculating an autocorrelation matrix of the matrix $\hat{R}$; performing singular value decomposition on the autocorrelation matrix $\mathbb{E}(\hat{R} \cdot \hat{R}'')$ of the matrix $\hat{R}$ to obtain $\mathbb{E}(\hat{R} \cdot \hat{R}'') = \hat{U} \hat{\Lambda} \hat{U}''$, wherein $\hat{R}''$ is a transposed conjugate matrix of the matrix $\hat{R}$, $\hat{U}''$ is a transposed conjugate matrix of $\hat{U}$, $\hat{U}=[\hat{u}_1, \ldots, \hat{u}_N]$ is an orthogonal matrix, and $\hat{u}_N$ is a n-th column of the matrix $\hat{U}$, a diagonal matrix $\hat{\Lambda}$ is $$\hat{\Lambda} = \begin{bmatrix} \lambda_1 & & \\ & \ddots & \\ & & \lambda_N \end{bmatrix},$$

N is the number of antennas receiving the mixed signals; and $\lambda_1, \ldots, \lambda_N$ are singular values of the autocorrelation matrix $\mathbb{E}(\hat{R} \cdot \hat{R}'')$;

arranging the singular values $\lambda_1, \ldots, \lambda_N$ from small to large; and setting singular values, whose numerical values are less than a preset threshold, among the singular values $\lambda_1, \ldots, \lambda_N$ to 0, and calculating a diagonal matrix $$\tilde{\Lambda} = \begin{bmatrix} \lambda_1 & & \\ & \ddots & \\ & & \lambda_n \end{bmatrix};$$

letting $\tilde{U} = [\hat{u}_1, \ldots, \hat{u}_N]$, calculating the to-be-classified mixed signals using a preset formula $\tilde{R} \triangleq \tilde{U} \cdot [\hat{r}_1, \ldots, \hat{r}_L]$; the matrix corresponding to the to-be-classified mixed signals is $\tilde{R}$; and determining the number of types of signals contained in the to-be-classified mixed signals based on the number of singular values that are not 0 among the singular values $\lambda_1, \ldots, \lambda_N$.

2. The method according to claim 1, wherein determining the separation matrix based on the number of types of signals contained in the to-be-classified mixed signals, comprises:

obtaining a preset number of iterations and an initial separation matrix w; and by means of a preset formula $$w_{m,(k)}^+ = \frac{1}{L} \sum_{i=1}^{L} \xi(w_{m,(k-1)} \tilde{r}_i) \tilde{r}_i^T - w_{m,(k-1)} \frac{1}{L} \sum_{(m)}^{L} \xi'(w_{m,(k-1)} \tilde{r}_i),$$

calculating the separation matrix w based on the number of iterations and the initial separation matrix ; wherein the separation matrix w has M rows and N columns, M represents the number of types of signals contained in the to-be-classified mixed signals, N represents the number of antennas receiving the mixed signals, L represents the number of times of receiving signals, $w_{m,(k)}^+$ represents a result of a m-th column of the separation matrix w after k iterations, $\xi(w_{m,(k-1)} \tilde{r}) = \tanh(w_{m,(k-1)} \tilde{r})$, $\xi'(w_{m,(k-1)} \tilde{r}) = \mathrm{sech}^2 (w_{m,(k-1)} \tilde{r})$, a vector $\tilde{r}_i$ is an i-th column of the to-be-classified mixed signals $\tilde{R}$.

3. The method according to claim 2, wherein separating individual signals in the to-be-classified mixed signals by means of the separation matrix to obtain to-be-identified signals, comprises:

normalizing the separation matrix w to obtain a matrix $\tilde{w}$;

multiplying the separation matrix $\tilde{w}$ with the matrix $\tilde{R}$ corresponding to the to-be-classified mixed signals to separate individual signals in the to-be-classified mixed signals to obtain the to-be-identified signals.

4. The method according to claim 1, wherein taking the calculated high-order cumulants as characteristics of the to-be-identified signal corresponding to the high-order cumulants respectively, comprises:

normalizing the high-order cumulants; and taking the normalized high-order cumulants as the characteristics of the to-be-identified signal corresponding to the high-order cumulants.

5. The method according to claim 1, wherein, the classification model is a support vector machine model;

before inputting the characteristics of the to-be-identified signal into the preset classification model, the method further comprises:

inputting training samples with labels into a current support vector machine model to obtain a modulation mode corresponding to each of the training samples output by the current support vector machine model;

calculating a loss value using a preset loss function based on an output result of the current support vector machine model and the labels of the training samples; and adjusting parameters in a current support vector machine according to the loss value to obtain the support vector machine model.

6. An apparatus for classifying mixed signals, comprising:

a receiving module configured for receiving mixed signals containing noises and at least two different types of signals;

an analysis module configured for performing calculation on a matrix corresponding to the mixed signals by means of a preset Principal Component Analysis PCA method to obtain to-be-classified mixed signals and to determine the number of types of signals contained in the to-be-classified mixed signals; wherein the to-be-classified mixed signals are mixed signals obtained after removing the noises in the mixed signals;

a determining module configured for determining a separation matrix based on the number of types of signals contained in the to-be-classified mixed signals;

a separating module configured for separating individual signals in the to-be-classified mixed signals by means of the separation matrix to obtain to-be-identified signals;

a calculating module configured for calculating a preset number of high-order cumulants corresponding to each to-be-identified signal in the to-be-identified signals respectively;

a characteristics module configured for taking the calculated high-order cumulants as characteristics of the to-be-identified signal corresponding to the high-order cumulants respectively;

an inputting module configured for inputting the characteristics of the to-be-identified signal into a preset classification model; wherein the classification model is used for calculating and outputting a modulation mode of the to-be-identified signal based on the characteristics of the to-be-identified signal; and an obtaining module configured for obtaining an output result of the classification model; wherein the output result comprises the modulation mode of the to-be-identified signal;

wherein performing calculation on the matrix corresponding to the mixed signals by means of the preset Principal Component Analysis PCA method to obtain to-be-classified mixed signals and to determine the number of types of signals contained in the to-be-classified mixed signals, comprises:

normalizing a matrix R corresponding to the mixed signals to calculate a matrix $\overline{R}$; wherein the matrix $\overline{R}$ is a matrix obtained by normalizing the matrix R corresponding to the mixed signals;

performing centralization processing on the matrix $\overline{R}$, so that an average value of the matrix $\overline{R}$ is 0, in order to calculate a matrix $\hat{R}$;

calculating an autocorrelation matrix of the matrix $\hat{R}$; performing singular value decomposition on the autocorrelation matrix $\mathbb{E}(\hat{R} \cdot \hat{R}'')$ of the matrix $\hat{R}$ to obtain $\mathbb{E}(\hat{R} \cdot \hat{R}'') = \hat{U}\hat{\Lambda}\hat{U}''$, wherein $\hat{R}''$ is a transposed conjugate matrix of the matrix $\hat{R}$, $\hat{U}''$ is a transposed conjugate matrix of $\hat{U}$, $\hat{U}=[\hat{u}_1, \ldots, \hat{u}_N]$ is an orthogonal matrix, and $\hat{u}_N$ is a n-th column of the matrix $\hat{U}$, a diagonal matrix $\hat{\Lambda}$ is $$\hat{\Lambda} = \begin{bmatrix} \lambda_1 & & \\ & \ddots & \\ & & \lambda_N \end{bmatrix},$$

N is the number of antennas receiving the mixed signals; and $\lambda_1, \ldots, \lambda_N$ are singular values of the autocorrelation matrix $\mathbb{E}(\hat{R} \cdot \hat{R}'')$;

arranging the singular values $\lambda_1, \ldots, \lambda_N$ from small to large; and setting singular values, whose numerical values are less than a preset threshold, among the singular values $\lambda_1, \ldots, \lambda_N$ to 0, and calculating a diagonal matrix $$\hat{\Lambda} = \begin{bmatrix} \lambda_1 & & \\ & \ddots & \\ & & \lambda_n \end{bmatrix};$$

letting $\tilde{U}=[\hat{u}_1, \ldots, \hat{u}_N]$, calculating the to-be-classified mixed signals using a preset formula $\tilde{R} \triangleq \tilde{U} \cdot [\hat{r}_l, \ldots, \hat{r}_L]$; the matrix corresponding to the to-be-classified mixed signals is $\tilde{R}$; and determining the number of types of signals contained in the to-be-classified mixed signals based on the number of singular values that are not 0 among the singular values $\lambda_1, \ldots, \lambda_N$.

7. An electronic device, including a processor, a communication interface, a memory, and a communication bus, wherein the processor, the communication interface and the memory communicate with each other through the communication bus;

the memory is configured for storing computer programs; and the processor is configured for implementing steps in the method according to any one of claim 1 when executing the computer programs stored in the memory.

8. A computer-readable storage medium, having stored thereon computer programs that, upon executed by a processor, cause the processor to implement steps in the method according to any one of claim 1.

* * * * *

UNITED STATES PATENT AND TRADEMARK OFFICE
CERTIFICATE OF CORRECTION

PATENT NO. : 11,816,180 B2  
APPLICATION NO. : 17/602692  
DATED : November 14, 2023  
INVENTOR(S) : Zhiyong Feng et al.

Page 1 of 5

It is certified that error appears in the above-identified patent and that said Letters Patent is hereby corrected as shown below:

In the Drawings

Sheet 1, Fig. 1b, the image of Fig. 1b should be replaced with the image provided below:

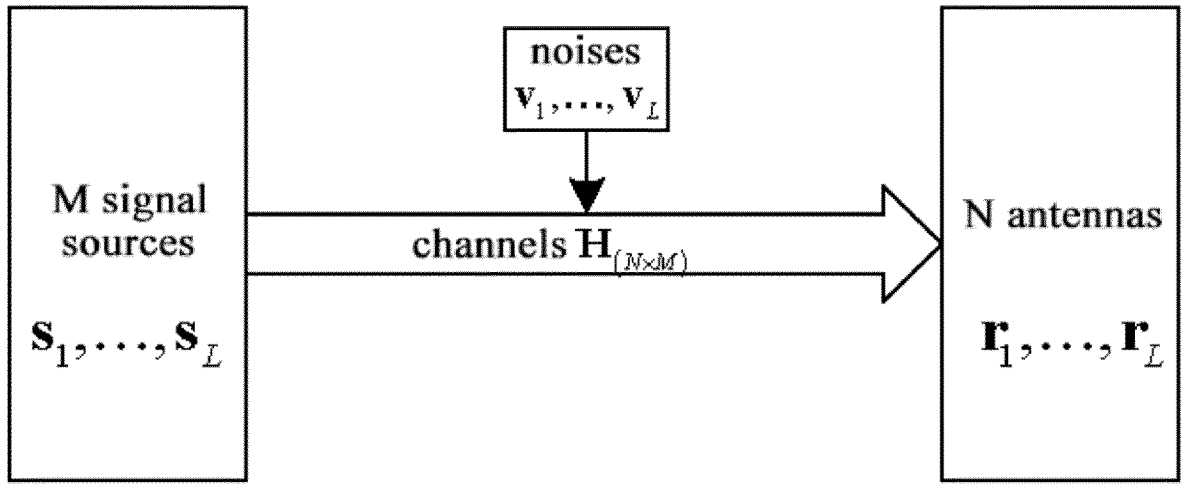

FIG. 1b

Signed and Sealed this  
Sixteenth Day of April, 2024

Katherine Kelly Vidal  
*Director of the United States Patent and Trademark Office*

CERTIFICATE OF CORRECTION (continued)  Page 2 of 5
U.S. Pat. No. 11,816,180 B2

Sheet 2, Fig. 2, and on the Title Page, the illustrative print figure, the image of elements 204, 205, and 206 should be replaced with image provided below:

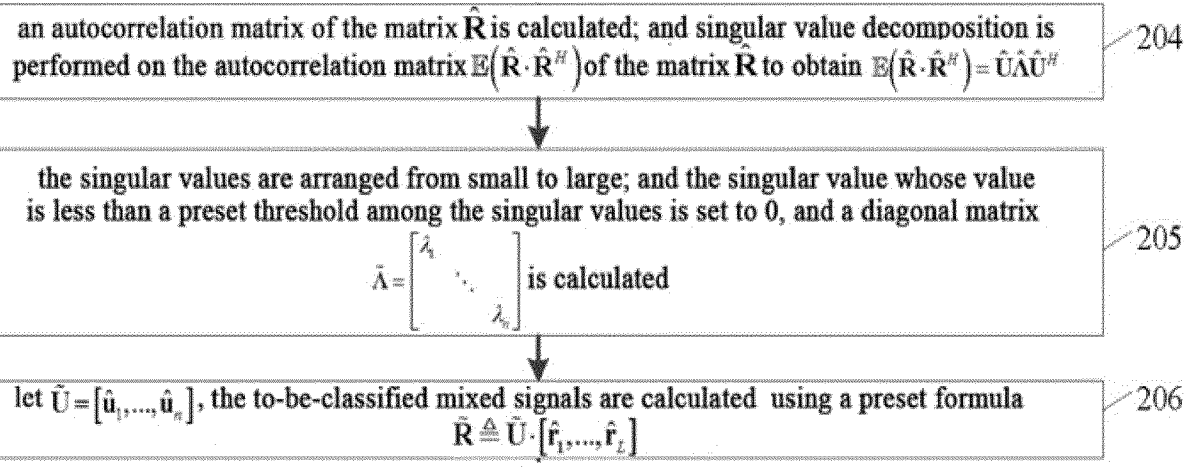

Sheet 3, Fig. 3, the image of Fig. 3 should be replaced with the image provided below:

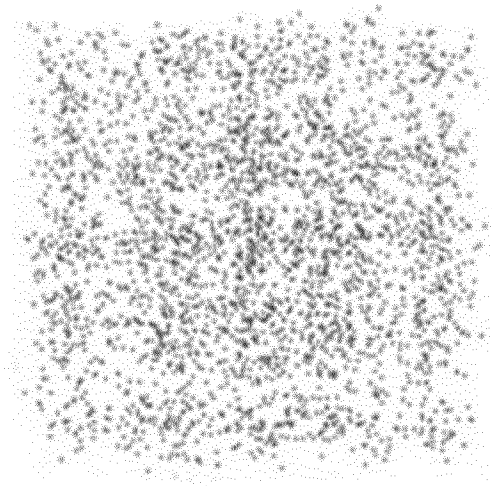

FIG. 3

Sheet 3, Fig. 4, the image of Fig. 4 should be replaced with the image provided below.

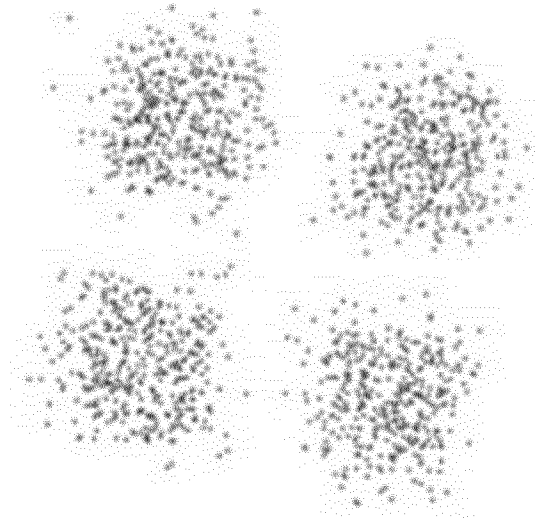

FIG. 4

In the Specification

In Column 2, Line 42, "E (R̂·R̂")" should read -- $\mathbb{E}\left(\hat{\mathbf{R}}\cdot\hat{\mathbf{R}}^H\right)$ --

In Column 2, Line 42, "E (R̂·R̂")=ÛΛÛ", wherein R̂""" should read -- $\mathbb{E}\left(\hat{\mathbf{R}}\cdot\hat{\mathbf{R}}^H\right)=\hat{\mathbf{U}}\hat{\mathbf{\Lambda}}\hat{\mathbf{U}}^H$, wherein $\hat{\mathbf{R}}^H$ --

In Column 2, Line 44, "Û"" should read -- $\hat{\mathbf{U}}^H$ --

In Column 2, Line 56, "E (R̂·R̂")" should read -- $\mathbb{E}\left(\hat{\mathbf{R}}\cdot\hat{\mathbf{R}}^H\right)$ --

In Column 3, Line 1, "Ũ[û₁, . . . , û_N]" should read -- $\tilde{\mathbf{U}} =[\hat{\mathbf{u}}_1,...,\hat{\mathbf{u}}_n]$ --

In Column 3, Line 2, "R̃≜Ũ·[r̂₁, . . . , r̂_L]" should read -- $\tilde{\mathbf{R}} \triangleq \tilde{\mathbf{U}}\cdot\left[\hat{\mathbf{r}}_1,...,\hat{\mathbf{r}}_L\right]$ --

In Column 8, Line 18, "ξ(w_{m,(k-1)}r̃)=sech²" should read -- $\zeta'(\mathbf{w}_{m,(k-1)}\tilde{\mathbf{r}}) = \text{sech}2$ --

In Column 11, Line 24, "E (R̂·R̂")" should read -- $\mathbb{E}\left(\hat{\mathbf{R}}\cdot\hat{\mathbf{R}}^H\right)$ --

In Column 11, Line 25, "E (R̂·R̂")=ÛΛÛ", wherein R̂" should read -- $\mathbb{E}\left(\hat{\mathbf{R}}\cdot\hat{\mathbf{R}}^H\right)=\hat{\mathbf{U}}\hat{\mathbf{\Lambda}}\hat{\mathbf{U}}^H$, wherein $\hat{\mathbf{R}}^H$ --

CERTIFICATE OF CORRECTION (continued)
U.S. Pat. No. 11,816,180 B2

In Column 11, Line 26, "$\hat{U}"$" should read -- $\hat{U}^H$ --

In Column 11, Line 33, "$\bar{\Lambda} = \begin{bmatrix} \lambda_1 & & \\ & \ddots & \\ & & \lambda_N \end{bmatrix}$," should read -- $\hat{\Lambda} = \begin{bmatrix} \lambda_1 & & \\ & \ddots & \\ & & \lambda_N \end{bmatrix}$, --

In Column 11, Line 38, "$\mathbb{E}(\hat{R}\cdot\hat{R}")$" should read -- $\mathbb{E}(\hat{R}\cdot\hat{R}^H)$ --

In Column 11, Line 51, "$\tilde{U}=[\hat{u}_1, \ldots, \hat{u}_N]$" should read -- $\tilde{U}=[\hat{u}_1,...,\hat{u}_n]$ --

In Column 11, Line 52, "$\tilde{R} \triangleq \tilde{U}\cdot[\hat{r}_1, \ldots, \hat{r}_L]$," should read -- $\tilde{R} \triangleq \tilde{U}\cdot[\hat{r}_1,...,\hat{r}_L]$ --

In Column 12, Line 21, "$W_{m,(k)}{}^+$" should read -- $W^+_{m,(k)}$ --

In Column 12, Line 65, "$\hat{C}_{40}(x) = \frac{1}{N}\sum_{n=1}^{N} x^4[n] - 3\bar{C}_{2n}(x)$" should read -- $\hat{C}_{40}(x) = \frac{1}{N}\sum_{n=1}^{N} x^4[n] - 3\hat{C}_{20}(x)$ --

In the Claims

In Column 17, Claim 1, Line 8, "$\mathbb{E}(\hat{R}\cdot\hat{R}")$" should read -- $\mathbb{E}(\hat{R}\cdot\hat{R}^H)$ --

In Column 17, Claim 1, Line 9, "$\mathbb{E}(\hat{R}\cdot\hat{R}")=\hat{U}\hat{\Lambda}\hat{U}"$, wherein $\hat{R}"$" should read -- $\mathbb{E}(\hat{R}\cdot\hat{R}^H)=\hat{U}\hat{\Lambda}\hat{U}^H$ wherein $\hat{R}^H$ --

In Column 17, Claim 1, Line 10, "$\hat{U}"$" should read -- $\hat{U}^H$ --

In Column 17, Claim 1, Line 12, "$\hat{u}_N$" should read -- $\hat{u}_n$ --

In Column 17, Claim 1, Line 16, "$\bar{\Lambda} = \begin{bmatrix} \lambda_1 & & \\ & \ddots & \\ & & \lambda_N \end{bmatrix}$," should read -- $\hat{\Lambda} = \begin{bmatrix} \lambda_1 & & \\ & \ddots & \\ & & \lambda_N \end{bmatrix}$, --

In Column 17, Claim 1, Line 23, "$\mathbb{E}(\hat{R}\cdot\hat{R}")$" should read -- $\mathbb{E}(\hat{R}\cdot\hat{R}^H)$ --

CERTIFICATE OF CORRECTION (continued)
U.S. Pat. No. 11,816,180 B2

In Column 17, Claim 1, Line 36, "$\tilde{U}=[\hat{u}_1, \ldots, \hat{u}_N]$" should read -- $\tilde{U}=[\hat{\mathbf{u}}_1,...,\hat{\mathbf{u}}_n]$ --

In Column 17, Claim 1, Line 37, "$\tilde{R} \triangleq \tilde{U} \cdot [\hat{r}_1, \ldots, \hat{r}_L]$" should read -- $\tilde{\mathbf{R}} \triangleq \tilde{\mathbf{U}} \cdot [\hat{\mathbf{r}}_1,...,\hat{\mathbf{r}}_L]$ --

In Column 17, Claim 2, Line 54,

"$w^+_{m,(k)} = \frac{1}{L}\sum_{i=1}^{L}\xi(w_{m,(k-1)}\tilde{r}_i)\tilde{r}_i^T - w_{m,(k-1)}\frac{1}{L}\sum_{(m)}^{L}\xi'(w_{m,(k-1)}\tilde{r}_i)$" should read -- $\mathbf{w}^+_{m,(k)} = \frac{1}{L}\sum_{i=1}^{L}\xi(\mathbf{w}_{m,(k-1)}\tilde{\mathbf{r}}_i)\tilde{\mathbf{r}}_i^T - \mathbf{w}_{m,(k-1)}\frac{1}{L}\sum_{i=1}^{L}\xi'(\mathbf{w}_{m,(k-1)}\tilde{\mathbf{r}}_i)$ --

In Column 17, Claim 2, Line 58, "matrix" should read -- matrix *w* --

In Column 17, Claim 2, Line 63, "$W_{m,(k)}^+$" should read -- $\mathbf{w}^+_{m,(k)}$ --

In Column 19, Claim 6, Line 20, "$\mathbb{E}(\hat{R} \cdot \hat{R}'')$" should read -- $\mathbb{E}(\hat{\mathbf{R}} \cdot \hat{\mathbf{R}}^H)$ --

In Column 19, Claim 6, Line 21, "$\mathbb{E}(\hat{R} \cdot \hat{R}'')=\hat{U}\hat{\Lambda}\hat{U}''$, wherein $\hat{R}'''$" should read -- $\mathbb{E}(\hat{\mathbf{R}} \cdot \hat{\mathbf{R}}^H) = \hat{\mathbf{U}}\hat{\Lambda}\hat{\mathbf{U}}^H$, wherein $\hat{\mathbf{R}}^H$ --

In Column 19, Claim 6, Line 22, "$\hat{U}''$" should read -- $\hat{U}^H$ --

In Column 19, Claim 6, Line 24, "$\hat{u}_N$" should read -- $\hat{u}_n$ --

In Column 19, Claim 6, Line 35, "$\mathbb{E}(\hat{R} \cdot \hat{R}'')$" should read -- $\mathbb{E}(\hat{\mathbf{R}} \cdot \hat{\mathbf{R}}^H)$ --

In Column 20, Claim 6, Line 12, "$\tilde{U}=[\hat{u}_1, \ldots, \hat{u}_N]$" should read -- $\tilde{U}=[\hat{u}_1,...,\hat{u}_n]$ --

In Column 20, Claim 6, Line 13, "$\tilde{R} \triangleq \tilde{U} \cdot [\hat{r}_1, \ldots, \hat{r}_L]$" should read -- $\tilde{\mathbf{R}} \triangleq \tilde{\mathbf{U}} \cdot [\hat{\mathbf{r}}_1,...,\hat{\mathbf{r}}_L]$ --

In Column 20, Claim 8, Line 30, "A computer-readable" should read -- A non-transitory computer-readable --

In Column 20, Claim 8, Line 33, "any one of claim 1" should read -- according to claim 1 --